(12) United States Patent
Stair et al.

(10) Patent No.: US 8,324,755 B2
(45) Date of Patent: Dec. 4, 2012

(54) POWER MANAGEMENT SYSTEM AND METHOD OF OPERATING THE SAME

(75) Inventors: Kenny J. Stair, North Prairie, WI (US); Brandon M. Batzler, Hartford, WI (US)

(73) Assignee: Briggs and Stratton Corporation, Wauwatosa, WI (US)

( * ) Notice: Subject to any disclaimer, the term of this patent is extended or adjusted under 35 U.S.C. 154(b) by 758 days.

(21) Appl. No.: 12/399,455

(22) Filed: Mar. 6, 2009

(65) Prior Publication Data

US 2010/0225167 A1 Sep. 9, 2010

(51) Int. Cl.
*H02J 1/10* (2006.01)
*H02J 3/38* (2006.01)
*H02J 9/00* (2006.01)

(52) U.S. Cl. .......................................... 307/23; 700/295
(58) Field of Classification Search .................. None
See application file for complete search history.

(56) References Cited

U.S. PATENT DOCUMENTS

| | | | |
|---|---|---|---|
| 4,031,345 A | 6/1977 | Garcia | |
| 4,292,546 A * | 9/1981 | Clark | ............................ 307/114 |
| 4,439,649 A | 3/1984 | Cecchi | |
| 4,549,092 A | 10/1985 | Matsuoka et al. | |
| 4,668,876 A | 5/1987 | Skarman | |
| 4,889,999 A | 12/1989 | Rowen | |
| 4,977,515 A | 12/1990 | Rudden et al. | |
| 5,066,898 A | 11/1991 | Miller et al. | |
| 5,095,181 A | 3/1992 | Osika et al. | |
| 5,158,172 A | 10/1992 | Roeser et al. | |
| 5,170,068 A | 12/1992 | Kwiatkowski et al. | |
| 5,237,207 A | 8/1993 | Kwiatkowski et al. | |
| 5,239,205 A | 8/1993 | Hoffman et al. | |
| 5,340,954 A | 8/1994 | Hoffman et al. | |
| 5,462,225 A * | 10/1995 | Massara et al. | ................. 236/47 |
| 5,576,700 A | 11/1996 | Davis et al. | |
| 5,818,128 A | 10/1998 | Hoffman et al. | |
| 6,653,821 B2 | 11/2003 | Kern et al. | |
| 6,671,586 B2 | 12/2003 | Davis et al. | |
| 6,832,135 B2 | 12/2004 | Ying | |
| 6,862,498 B2 | 3/2005 | Davis et al. | |
| 6,891,478 B2 | 5/2005 | Gardner | |
| 7,015,599 B2 | 3/2006 | Gull et al. | |
| 7,161,329 B2 | 1/2007 | McLoughlin et al. | |
| 7,184,861 B2 | 2/2007 | Petite | |
| 7,230,345 B2 | 6/2007 | Winnie et al. | |
| 7,356,384 B2 | 4/2008 | Gull et al. | |
| 2002/0175637 A1 * | 11/2002 | Wilhelm | ........................ 315/224 |
| 2003/0036822 A1 * | 2/2003 | Davis et al. | ................... 700/295 |
| 2003/0075982 A1 | 4/2003 | Seefeldt | |
| 2004/0075343 A1 * | 4/2004 | Wareham et al. | ............... 307/39 |
| 2004/0262997 A1 * | 12/2004 | Gull et al. | ....................... 307/64 |
| 2005/0216131 A1 | 9/2005 | Sodemann et al. | |

(Continued)

*Primary Examiner* — Rexford Barnie
*Assistant Examiner* — Justen Fauth
(74) *Attorney, Agent, or Firm* — Michael Best & Friedrich LLP (57) ABSTRACT

A power management system connectable to a primary power source and a secondary power source, and a method of operating the power management system. A transfer switch is electrically connected to the primary and secondary power sources, and a plurality of branch circuits are electrically connected to the transfer switch. The plurality of branch circuits includes a plurality of electrical outlets. The system includes a controller wirelessly coupled to a plurality of portable receptacles, which are coupled between respective electrical outlets and managed devices. The controller manages the receptacles, and consequently the managed devices, during the second power source powering the transfer switch.

17 Claims, 7 Drawing Sheets

U.S. PATENT DOCUMENTS

| | | | |
|---|---|---|---|
| 2006/0052906 A1* | 3/2006 | Kates | 700/295 |
| 2007/0135973 A1 | 6/2007 | Petite | |
| 2007/0222295 A1* | 9/2007 | Wareham et al. | 307/32 |
| 2010/0152914 A1* | 6/2010 | Ying | 700/295 |

* cited by examiner

POWER MANAGEMENT SYSTEM AND METHOD OF OPERATING THE SAME

BACKGROUND OF THE INVENTION

The invention relates to power management systems and methods of operating power management systems.

Typical power transfer systems connect one or more circuit branches to either a primary power source, such as utility power, or a secondary power source, such as a portable or standby generator. Each circuit branch can connect to one or more loads, and typically includes one or more manually controlled circuit breakers that are controllable by an operator.

For typical power transfer systems located at a residence, the systems connect a plurality of circuits to a generator acting as the secondary power source. Residential generators vary in size and power output. In general, as the amount of rated power (or current) increases, the size, weight, and cost of the generator increases, and the amount of noise produced by the engine, which powers the generator, increases. Therefore, it is beneficial to use a power management system for controlling or reducing the power demand on a generator, thereby allowing a smaller generator to be used for applications that typically require a larger generator.

Typical power management systems include a plurality of switches (e.g., relays or controllable breakers) for controlling (e.g., adding or shedding) a plurality of loads. However, typical power management systems control circuit branches, which can power an unspecified number of loads. A new system is desired that allows for more flexibility than the typical power management system.

SUMMARY OF THE INVENTION

In one embodiment, the invention provides a load management system for managing a plurality of devices. The plurality of managed devices is connected to a distribution panel via a plurality of branch circuits having a circuit breaker and an electrical outlet. For example, each of the plurality of branch circuits can include a circuit breaker, but not all of the branch circuits may include an electrical outlet. The distribution panel is powered by at least one of utility power and a backup generator. The load management system is connectable to a device controller for controlling a first managed device.

The system includes a portable receptacle electrically connected in circuit between the electrical outlet and a second managed device. The portable receptacle is, by definition, portable, and allows a user to vary the second managed device without re-wiring the system. The portable receptacle includes a first antenna, a switch to electrically connect the electrical outlet to the second managed device, and circuitry electrically connecting the first antenna and the switch. The circuitry includes a first controller to control the switch based on a signal received by the first antenna. In some embodiments, the portable receptacle includes a priority, which can be set via a switch. A user can either modify the priority or move the portable receptacle to modify the management of the system. This can be done without the help of an electrician. Further, the use of the portable receptacle allows a user to manage a device of a branch circuit without having to manage the full branch circuit. Moreover, multiple devices on the same branch circuit can be managed differently with multiple portable receptacles.

The load management system further includes a load management controller electrically connected to the device controller. The load management controller includes a processor, a memory having instructions executable by the processor, and a second RF antenna coupled to the processor. The processor executes the instructions to receive a control signal from the device controller, and to manage the first and second managed device based on the control signal and a value representing the draw on the generator.

Other features of the invention will become apparent by consideration of the detailed description and accompanying drawings.

DETAILED DESCRIPTION

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof is meant to encompass direct and indirect connections, couplings, and mountings. In addition, the terms "connected" and "coupled" and variations thereof are not restricted to physical or mechanical connections or couplings.

As should also be apparent to one of ordinary skill in the art, the systems shown in the figures are models of what actual systems might be like. As may be noted, some of the modules and logical structures described are capable of being implemented in software executed by a processor or a similar device or of being implemented in hardware using a variety of components including, for example, application specific integrated circuits ("ASICs"). Terms like "processor", "filter", and "controller" may include or refer to hardware and/or software. Thus, the claims should not be limited to the specific examples or terminology or to any specific hardware or software implementation or combination of software or hardware.

Figure 1:
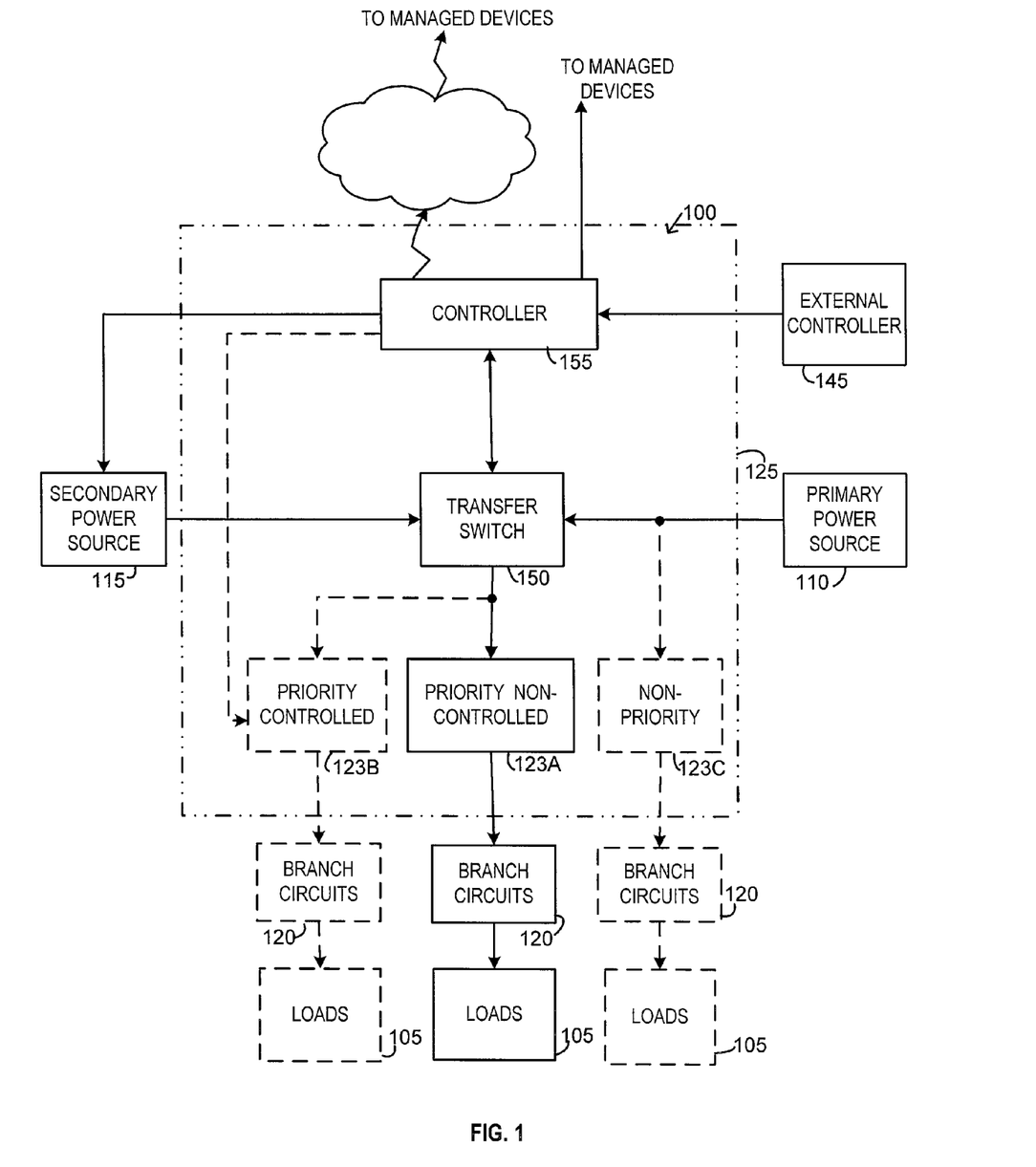
FIG. 1 is a block diagram representing an electrical system of a residence including a load management system incorporating the invention.

A load management system 100 is schematically shown in FIG. 1. The system 100 controllably connects a plurality of loads 105 to either a primary power source 110 (e.g., a utility power source, a main power source, etc.) or a secondary power source 115 (e.g., a back-up power source such as a portable or standby generator). By controllably connecting the loads 105 to the primary or secondary power sources 110 or 115, the primary or secondary power sources 110 or 115 selectively power the loads 105.

As used herein, the primary power source 110 is the power source that provides the preferred power. That is, the system 100 controllably connects the loads 105 to the primary power source 110 (typically, utility power) when the primary power source 110 provides adequate power (i.e., power of sufficient quality and quantity). Utility power can be provided by a publicly available power source or company. The secondary power source 115 is an independent source from the primary power source 110, and provides secondary or back-up power preferably when the primary power source 110 fails to provide adequate power. An exemplary secondary power source 115 is a 120/240 Volts AC generator. An "automatic" generator system includes a generator that automatically starts and shuts down in response to signals provided by a transfer switch, for example, and automatically transfers between the primary and secondary power sources 110 and 115. An automatic generator may be hardwired with the system 100, and the system 100 is typically referred to as an automatic or emergency backup system. A "manual" generator system includes a generator that requires manual starting and manually transfers between the primary and secondary power sources 110 and 115. Other variations are possible.

Figure 2:
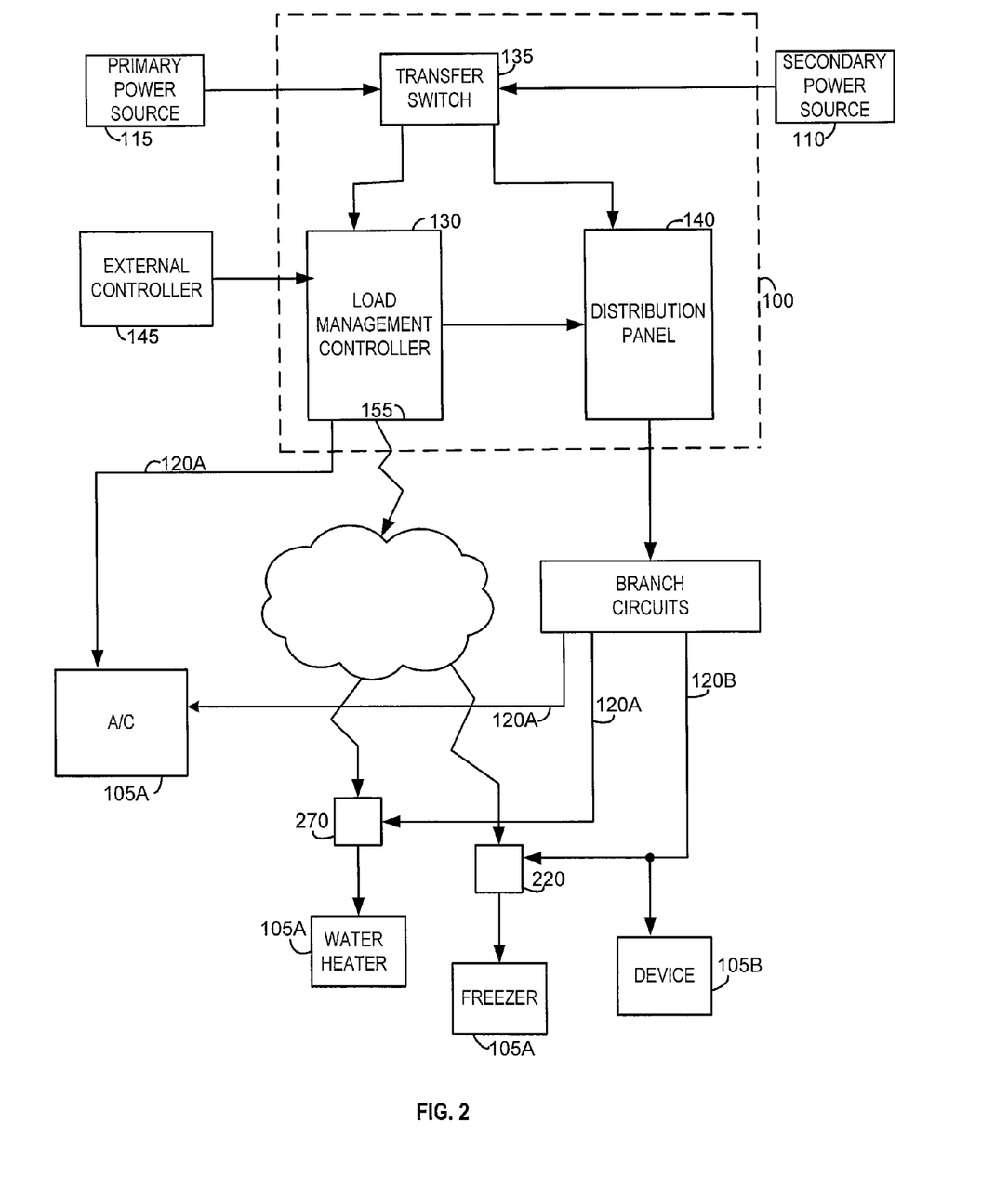
FIG. 2 is a block diagram providing more detail of an electrical system of a building including the load management system of FIG. 1.

The loads 105 include any number of electrical loads configured to receive electrical power. The loads 105 are connected to the system 100 via branch circuits 120. The branch circuits 120 are controlled by switches, such as relays or circuit breakers 123. The branch circuits 120 are either "dedicated" branch circuits 120A (FIG. 2) or "non-dedicated" branch circuits 120B (FIG. 2). A "dedicated" branch circuit 120A includes one or more loads 105 that are hardwire to that branch. For example, if the system is located at a residence, then an air conditioner, a furnace, a sump pump and similar devices may be hardwired in respective dedicated branch circuits 120A. A "non-dedicated" branch circuit 120B includes one or more outlets, connection boxes, or similar connection points that are capable of receiving connections from one or more electrical loads (e.g., lights, electronics, a refrigerator, a freezer, etc.)

As shown in FIG. 1, the system 100 is located within a panel 125 with wires either connected to or connectable with the primary power source 110, the secondary power source 115, and loads 105. In other constructions, the panel 125 includes a plurality of panels or cabinets in communication with one another. For example and as best shown in FIG. 2, the system 100 can include three cabinets: a controller cabinet 130, a transfer switch cabinet 135, and a branch circuit (or distribution) cabinet 140. For the description below and unless specified otherwise, it will be assumed that the system 100 is located within a single cabinet 125 (FIG. 1).

Referring again to FIG. 1, the system 100 is also connected to an external or device controller 145, which provides inputs (e.g., data, signals, etc.) to the system 100. For example, the external controller 145 may be a thermostat that generates a call to activate an air conditioner.

As shown in FIG. 1, the system 100 generally includes a transfer switch 150, a plurality of branch circuits 120, a plurality of circuit breakers 123A, 123B, and 123C, and a controller 155. The transfer switch 150 connects a plurality of branch circuits 120 to either the primary power source 110 or the secondary power source 115. For the description below and unless specified otherwise, it will be assumed that the elements shown in phantom are not included in the main construction discussed herein. As used herein, the term "transfer switch" is broadly construed to include one or more transfer switches, one or more relays, and/or one or more contactors, all of which are operable to connect a plurality of electrical loads 105 to the primary power source 110 or the secondary power source 115.

Figure 3:
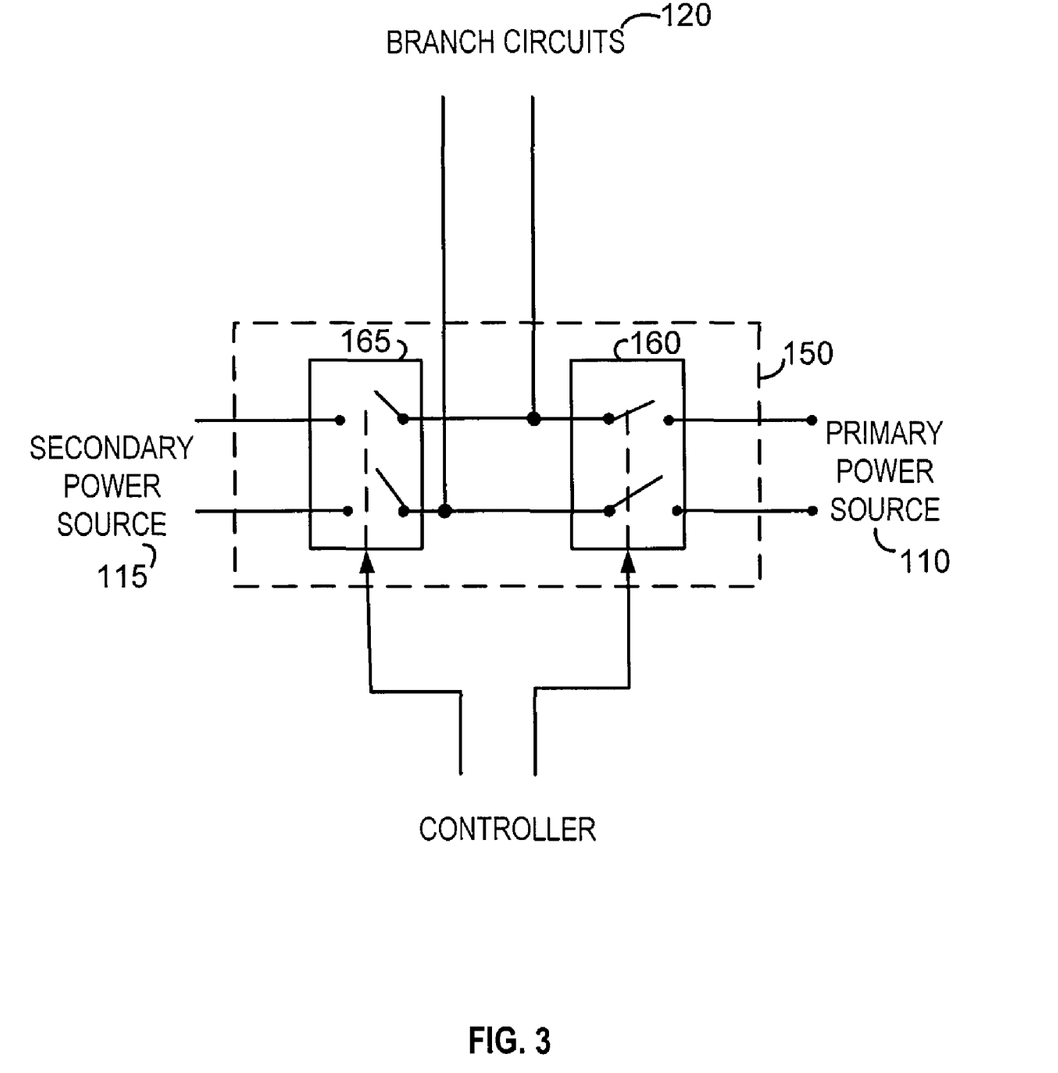
FIG. 3 is a block diagram representing an exemplary transfer switch capable of being used with the load management system of FIG. 1.

An exemplary transfer switch 150 is schematically shown in FIG. 3. With reference to FIG. 3, the transfer switch 150 includes first and second relays 160 and 165. The first relay 160 is connected to the primary power source 110 while the second relay 165 is connected to the secondary power source 115. Both of these relays 160 and 165 include one or more bodies or wipes that are movable between a first or open position, where the relay constitutes an open device, and a second or closed position, where the relay constitutes a closed device. The first and second relays 160 and 165 are also connected to one or more branch circuits 120. When the first relay 160 is closed, the primary power source 110 powers the one or more branch circuits 120. When the second relay 165 is closed, the secondary power source 115 powers the one or more branch circuits 120. The second relay 165 is open when the first relay 160 is closed and vice-versa. As shown in FIG. 3, the first and second relays 160 and 165 are double-pole, single throw relays.

Referring again to FIG. 1, the controller 155 controls the transfer switch 150 such that the controller 155 controllably connects the branch circuits 120 to the power sources 110 or 115. For example and in one construction, the controller 155 controls the transfer switch 150 such that the transfer switch 150 connects the branch circuits 120 to the primary power source 110 when the controller 155 detects adequate power being supplied by the primary power source 110. If the controller 155 does not detect adequate power being supplied by the primary power source 110 and detects adequate power being supplied by the secondary power source 115, then the controller 155 controls the transfer switch 150 such that the secondary power source 115 supplies power to the branch circuits 120.

The control of the transfer switch 150 by the controller 155 varies depending on the type of secondary power source 115 and the type of transfer switch 150. For example and in one controller 155, when the controller 155 disconnects the primary power source from the branch circuits 120, the controller 155 may wait a time delay before connecting the secondary power source to the branch circuits 120.

Before proceeding further, it should be understood that the transfer switch can include a second controller distinct from the first shown controller 155, the second controller separately controlling the transfer switch 155 and communicating its operation to the first controller 155. That is, the controller 155 shown in FIG. 1 is a non-distributed controller, but the controller 155 can encompass a distributed controller distributed among multiple components within the panel 125.

Figure 4:
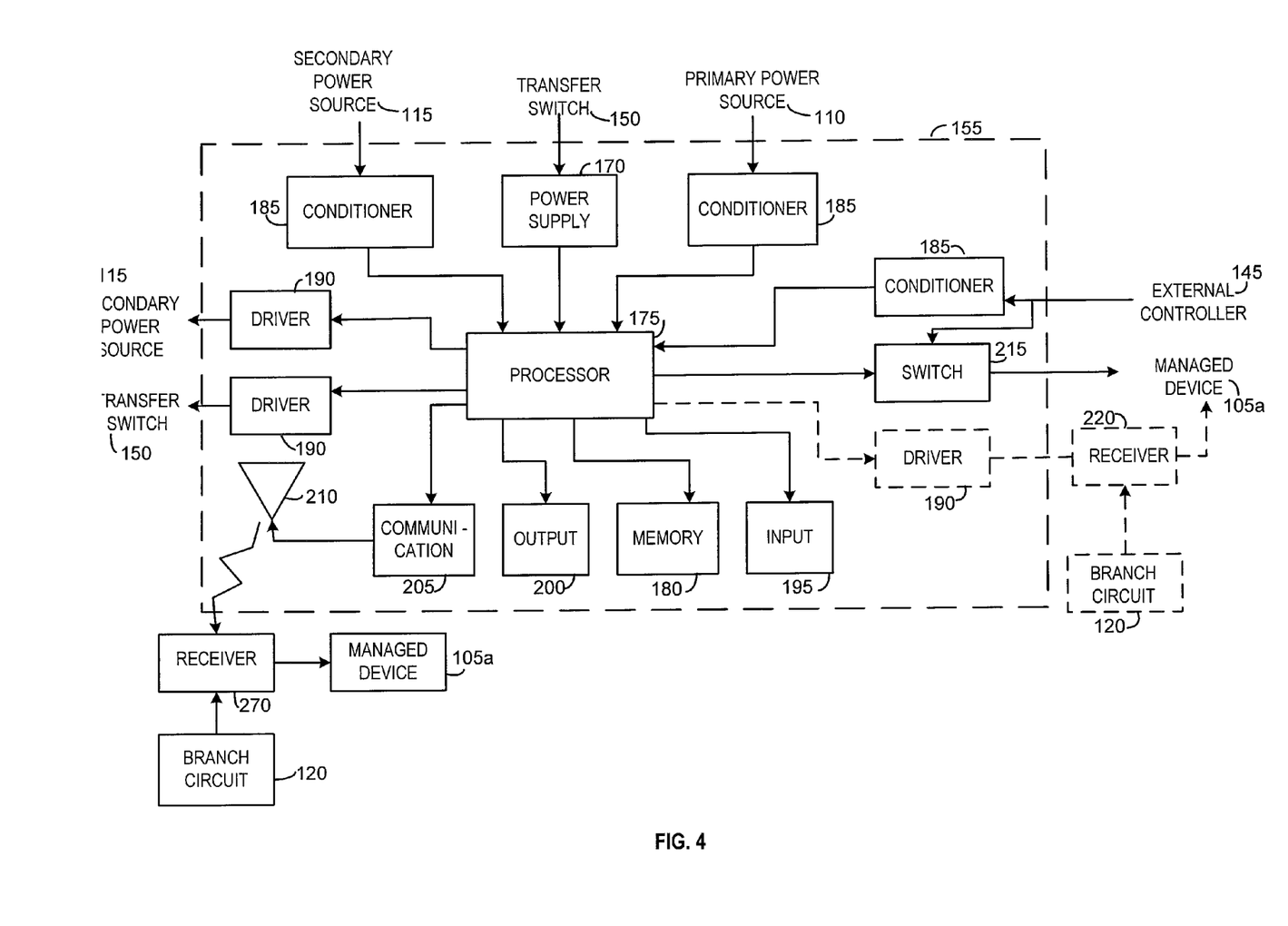
FIG. 4 is a block diagram representing a load management controller capable of being used in the load management system of FIG. 1.

An exemplary construction of the controller 155 is schematically shown in FIG. 4. In general, the controller 155 receives inputs (e.g., from the external controller 145); interprets the received inputs; and provides outputs (e.g., to manage devices 105A). As used herein, the terms "inputs" and "outputs" are broadly construed to include data, commands, and/or signals.

For the construction shown in FIG. 4, the controller 155 includes a power supply 170, a processor 175, a memory 180, multiple conditioners 185, multiple drivers 190, one or more input devices 195, and one or more output devices 200. The power supply 170 is connected in circuit with the primary and secondary power sources 110 and 115 and receives power from the sources 110 and 115. The power supply 170 includes circuitry for converting the supplied power to a voltage (e.g., 5 VDC) for powering the controller 155. The power supply 170 can include a temporary storage device (e.g., a chargeable battery, capacitors, etc.) that temporarily provides power if neither power source 110 nor 115 supplies sufficient power for operating the controller 155. In other constructions, the power supply 170 is not connected to either supply 110 or 115 and is powered by a battery.

The memory 180 includes a program storage that stores one or more software modules having instructions. The processor 175 receives, interprets, and executes the software instructions of the one or more software modules. The processor 175 executes the instructions to control the operation of the system 100 and, to some extent, the automatic generator. In some constructions, the processor 175 and the memory 180 take the form of a microcontroller, which includes other elements (e.g., an analog-to-digital converter) customarily part of the microcontroller. The controller 155 can include or can be constructed with other analog and/or digital logic circuitry, and can include integrated and/or discrete circuit elements. Other processors 175 include, or are encompassed in, a programmable logic circuit, a programmable relay, an application-specific-integrate circuit (ASIC), a microprocessor, a digital signal processor, and similar devices.

The controller 155 can include other circuitry known to those skilled in the art. For the construction shown, the controller 155 includes multiple conditioning circuits 185 that provide multiple inputs to the processor 175. The conditioners 185, which can include discrete and/or integrated circuitry, condition incoming signals to the necessary voltage and/or current levels for the processor. Also for the construction shown, the controller 155 includes multiple driver circuits 190. The drivers 190, which can also include discrete and/or integrated circuitry, transform outgoing signals from the processor 175 to the necessary voltage and/or current levels for attached devices.

The one or more input devices 195 allow an operator to control the system 100 and/or to provide inputs to the controller 155. Example input devices 195 include one or more push buttons, one or more knobs, one or more dip switches, a keyboard, a keypad, a touch screen, or similar components. The one or more output devices 200 allow the controller to communicate outputs to the operator. Example output devices 200 include a display (e.g., an LED display, an LCD display, a CRT display, etc.), one or more LEDs, one or more incandescent lights, and similar components. Also, the one or more output devices 200 and the one or more operator-controlled input devices 195 can be combined as a single device (e.g., a touch screen).

The controller 155 also includes a communication circuit 205 and antenna 210 for allowing the controller 155 to wirelessly communicate with a portable receptacle (discussed below). An example communication circuit 205 and antenna 210 includes a radio.

In the construction shown in FIG. 4, the controller further includes a switch 215, such as a relay, coupling the external controller 145 to a managed device 105A. For example, the external controller may be a thermostat and the managed device 105A may be an air conditioning system. The switch 215 can be used to controllably interrupt a control signal from being communicated to the managed device 105A. Hence, the processor can manage a managed device 105A by interrupting or allowing the external signal via switch 215. Alternatively, the external signal can be communicated to the processor 175 and the processor can drive a portable receptacle (disclosed below) via a driver 190, as shown in phantom in FIG. 4.

The group of branch circuits 120 is coupled to primary power source 110 and the secondary power source 115 via a plurality of circuit breakers 123, relays, or similar switches. Each branch circuit 120 includes at least one circuit breaker, respectively, or similar device. For example, assuming that the power sources 110 and 115 provide 240 VAC, then the branch circuits can be arranged such that a single circuit breaker 123 supplies 120 VAC and two circuit breakers 123 provide 240 VAC.

As was discussed above, each of the branch circuits 120 is either a dedicated branch circuit 120A (FIG. 2) or a non-dedicated branch circuit 120B (FIG. 2). If the branch circuit is a dedicated circuit 120A, then the one or more circuit breakers 123 of the branch circuit 120A are hardwired to the dedicated load. If the branch circuit is a non-dedicated circuit 120B, then the one or more circuit breakers 123 of the branch circuit 120B are connected to one or more outlets, connection boxes, or similar connection points.

The circuit breakers (or similar devices) 123 may be further defined by one of three types: priority and non-controlled 123A, priority and controlled 123B (shown in phantom), and non-priority 120C (shown in phantom). Priority and non-controlled circuit breakers 123A are connected to the transfer switch 150 and are not controlled by the controller 155. Controlled circuit breakers 123B are connected to the transfer switch 150 and are controlled by the controller 155 or a similar controller. The circuit breakers 123B allow complete branch circuits 120B to be managed. Non-priority circuit breakers 123C are connected to the primary power source 110 and power connected loads only when power is provided by the primary power source 110.

As best shown in FIG. 1, the branch circuits 120 not shown in phantom are powered by the primary power source 110 when that source 110 powers the transfer switch 150, and are powered by the secondary power source 115 when that source 115 powers the transfer switch 150. In the construction described herein, all of the branches circuits 120 are powered via circuit breakers 123A.

The loads can be further divided as a managed device 105A (FIG. 2) or a non-managed device 105B (FIG. 2). In general, a managed device 105A is a device that is controllably powered in response to a control signal, and a non-managed device 105B is a device that is not controllably powered. For example, a managed device 105A can receive power from one of the power sources via a portable receptacle 220 (FIG. 2) connected in circuit between the load and an electrical outlet 225 (FIG. 5) of a branch circuit 120. Alternatively, the controller 155 can directly provide a control signal (e.g., a 24 VAC control signal) to the managed load 105A as discussed earlier with FIG. 4.

Figure 5:
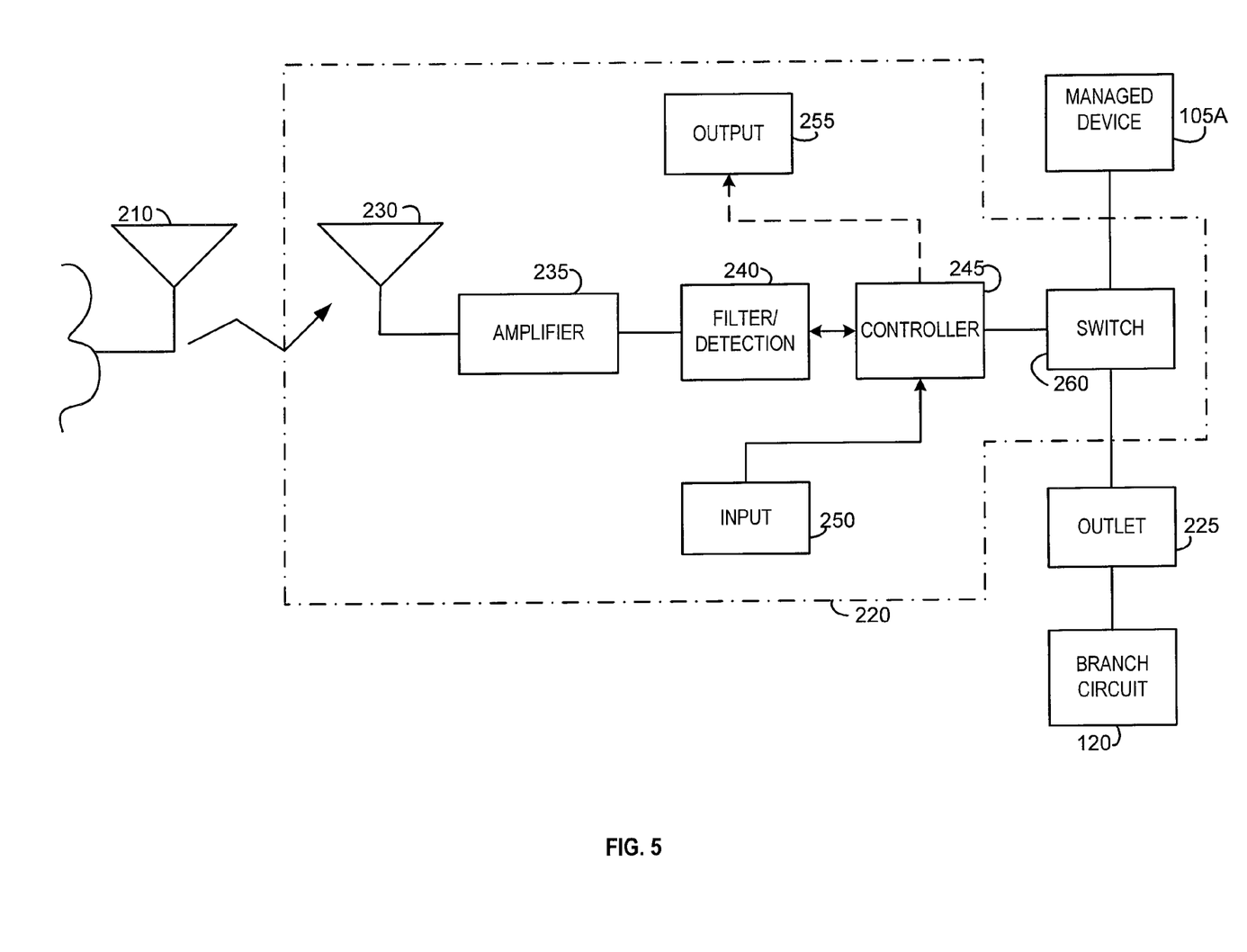
FIG. 5 is a block diagram further detailing a portion of the load management controller of FIG. 4 and representing a portable receptacle capable of being used with the load management system of FIG. 1.

One exemplary construction of a portable receptacle 220 is shown in FIG. 5. The portable receptacle 220 shown in FIG. 5 includes an antenna 230 to receive a wireless signal, an amplifier 235 to amplify the received signal, filter/detector circuitry 240 for filtering and/or detecting a signal intended for the portable receptacle 220, a controller 245 for controlling the portable receptacle 220, an input device 250 for setting an identifier for the portable receptacle, an output device 255 for providing information to a user, and a switch (e.g., a relay) for permitting or preventing a circuit connection between the outlet 225 and the managed device 105A based on a control signal from the controller 245. In one operation, a user or operator can electrically couple the portable receptacle 220 to an electrical outlet 225 and electrically couple a managed device 105A to the portable receptacle 220. The user can then select an identifier for the portable receptacle 220. The identifier can be associated with the priority level for the portable receptacle 220. For example, the portable receptacle 220 can include one or more switches to set the portable receptacle 220 to an identifier, e.g. A, indicating the portable receptacle 220 is the highest priority portable receptacle 220. The portable receptacle 220 then receives wireless signals from the controller 155 and filters the received signals based on the identifier. For example, the controller 155 can transmit a signal intended for the portable receptacle 220 with the identifier A. The portable receptacle 220 with the identifier A detects and filters the signal and is controlled based on the received signal. In one specific construction, the controller 155 transmits a signal for the portable receptacle 220 with the identifier A having a defined frequency, and the portable receptacle 220 with the identifier A filters the incoming received wireless signal to the corresponding frequency associated with the identifier A.

In a different construction, the portable receptacle 220 can include a set identifier, and the controller 155 can learn the identifier and associate a user-defined priority for the portable receptacle 220 with the identifier. The controller 155 can then include the identifier with the wireless communication to inform the portable receptacle 220 of a new command.

Referring to FIG. 2, a more specific exemplary construction is shown. For this construction, an air conditioning system 105A and a water heater 105A are electrically coupled to a distribution panel 140 via dedicated branch circuits 120A and a freezer is electrically coupled to the distribution panel 140 via a non-dedicated branch circuit 120B. A thermostat, i.e., an external controller 145, is electrically coupled to the air conditioning system via a switch 215 (FIG. 4) of the load management controller. In this construction, the load management controller 155 identifies the air conditioning system 105A as having the highest priority; the portable receptacle 220 for the water heater is set to identifier A, which the load management controller 155 identifies as having the next highest priority; and the portable receptacle 220 for the freezer is set to identifier B, which the load management controller 155 identifies as having the lowest priority.

Before proceeding further, it should be understood that the load management system 100 can manage the loads based on the priorities and based on other information, such as the load demand for the secondary power source and the expected load demand if the controller 155 permits a current to another managed device 105A. It should be further understood that the load management system 100 can manage the devices 105A out of priority order depending on the present load demand and the expected future load demand. However, in one construction, the load management system attempts to follow the priority order when possible. Exemplary schemes for managing loads can be based on the management schemes disclosed in U.S. Patent Publication Nos. 2006/0018069 and 2005/0216131, the contents of which are incorporated herein by reference.

Having described the architecture of various constructions of the system 100, the operation of the system 100 will now be described based on the specific example of FIG. 2. With reference to flow diagram shown in FIG. 6, it will be assumed that the primary power source 110 initially powers the loads 105 (step 300). That is, unless the circuit breakers 123 are open, the primary power source 110 powers the loads 105 connected to the closed branch circuits 120.

Figure 6:
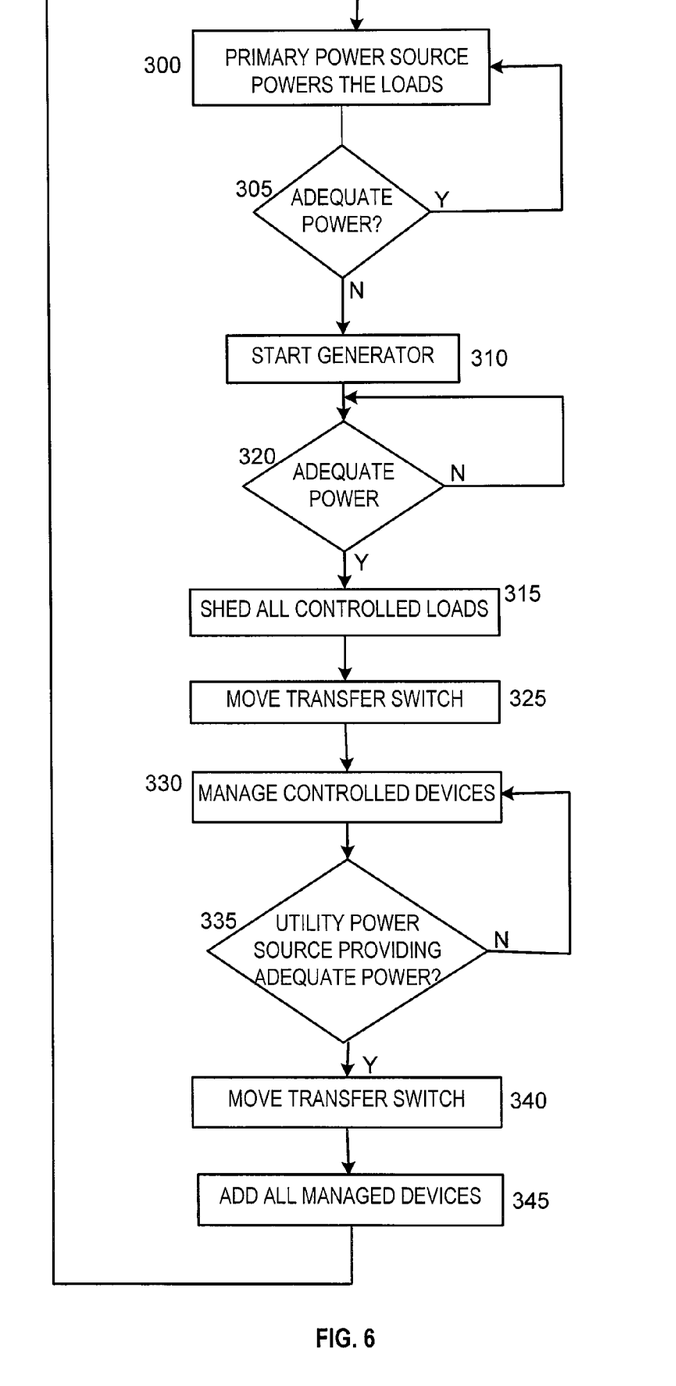
FIG. 6 is a flowchart representing one method of operating the load management system of FIG. 1.

At step 305, the controller 155 determines whether the primary power source 110 is providing adequate power (i.e., power of sufficient quality and quantity) to the system 100. For example, the system 100 may not receive any power from the primary power source 110 (i.e., a black-out condition), or receive power that is lacking in either quality or quantity (i.e., a brown-out condition).

When the controller 155 detects inadequate power, it provides an output to the generator 115 that starts the generator (step 310). Of course, there can be a small time delay before starting the generator 115.

For the description described below, when the controller 155 performs a function, the processor 175 retrieves one or more instructions from memory 180, interprets the retrieved instructions, and executes the interpreted instructions to perform the particular function. For example, if the controller 155 provides an output to the generator 115 to start the generator 115, then the processor 175 retrieves, interprets, and executes one or more software instructions to generate one or more output signals that start the generator 115. Other controllers 155 can perform differently.

At step 315, the controller 155 sheds all managed devices 105A. Before proceeding further, it should be understood that the sequence of the steps in FIG. 6 and FIG. 7, discussed below, can vary, one or more steps may occur concurrently, and not all steps may be required.

Once the generator 115 is generating adequate power (step 320), the controller 155 provides a signal to the transfer switch 150, resulting in the transfer switch 150 connecting the branch circuits 120A and 120B (i.e., the priority and controllable branch circuits) to the secondary power source 115 (step 325).

In another construction, the transfer switch 150 is operated separately from the controller 155. For this embodiment, the controller 155 senses the presence of power to the relays 160 and 165 or senses when the relays 160 and 165 are closed. That is, the relays can be wired to the controller 155 and the controller 155 can sense which relay is ON.

The non-managed devices 105B are immediately powered by the secondary power source 115. For example, if a furnace or similar heating system requires that power be available at all times, then the secondary power source 115 immediately makes power available to the furnace when the transfer switch 150 switches to the secondary power source 115. Other non-managed devices 105B are powered similarly. The managed device 105A is managed by the controller 155 (step 330). One exemplary management technique is described below in connection with FIG. 7.

When the controller 155 senses that the primary power source has provided adequate power for a time period (step 335), then the controller 155 switches the transfer switch 150 such that the primary power source 110 powers the distribution panel (step 340). The controller 155 also adds all the managed devices (step 345) and provides an output to the generator to shut down. In other constructions where the controller 155 operates separately from the transfer switch 150, the controller 155 detects when relay 160 is closed and when relay 165 is open. For this embodiment, the controller 155 adds all managed devices 105A in response to this condition.

Figure 7:
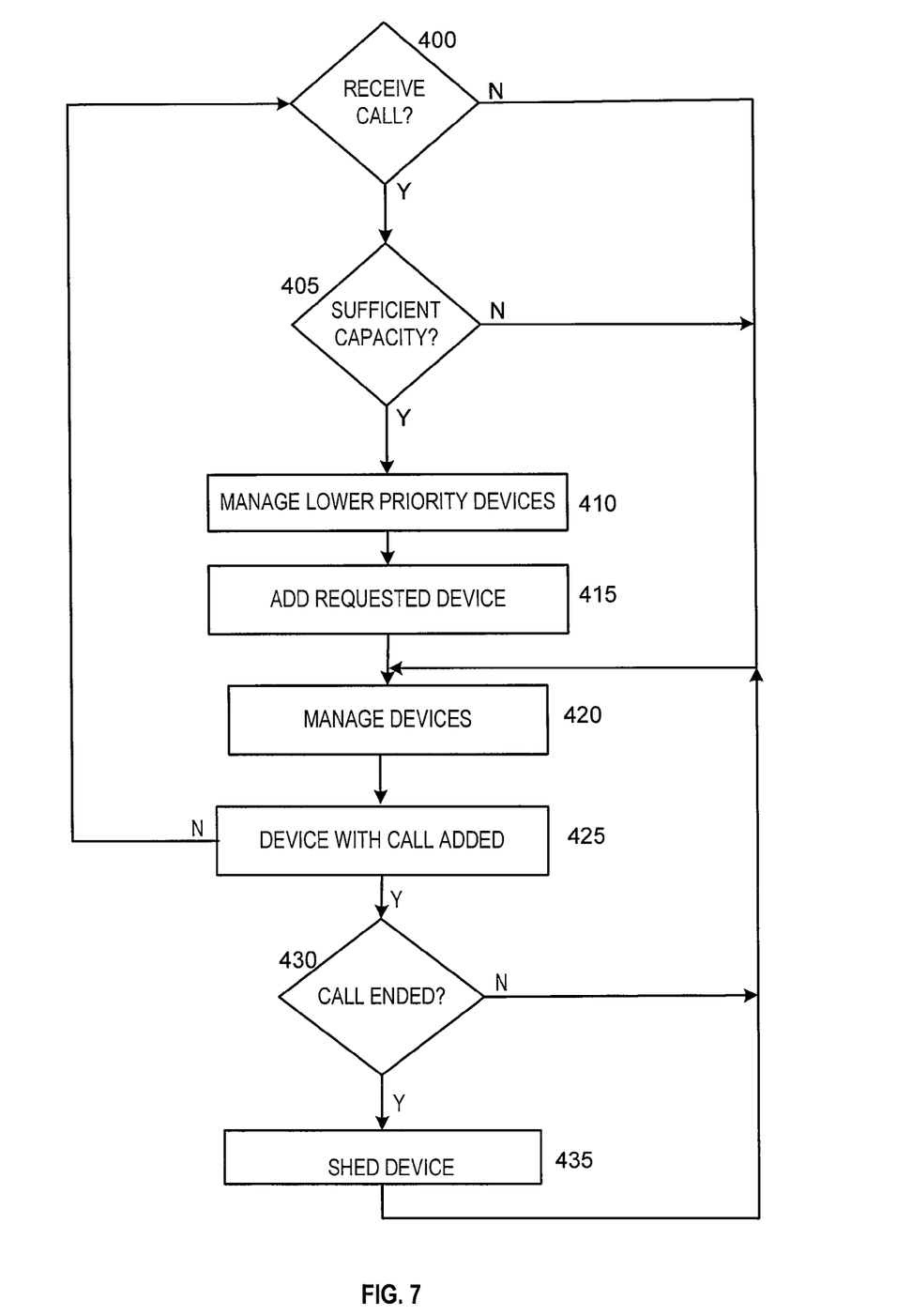
FIG. 7 is a flow chart representing one method of managing a plurality of managed devices.

FIG. 7 represents one method of managing devices 105A. When starting step 400, it is assumed that none of the managed devices 105A is receiving current from the generator. At step 400, the controller 155 receives a call from the thermostat 145. At step 405, the controller 155 determines whether the generator 115 has sufficient capacity to add the air conditioning system. For example, the memory 180 stores a value representative of an expected current or power draw for the air conditioning system, and then the controller 155 allows the thermostat signal to the air conditioning system if the expected draw is less than the unused capacity. If the expected draw is too great for the unused capacity of the generator, then the controller 155 determines whether the removal of a lower priority device allows sufficient capacity to add the air conditioning system. The result of step 405 is that the controller 155 manages the lower priority loads (step 410), if necessary, by transmitting a signal to the portable receptacle(s) 220 to open the switch(es) 260 and allowing the thermostat signal to the air conditioning system (step 415).

At step 420, the controller 155 manages the lower priority devices by controlling the respective portable receptacles to add and shed devices as is appropriate. If the air conditioning system was added at step 425, then the controller 155 determines whether the call for conditioned air has ended (step 430). If the call has ended, then the switch 260 is opened to shed the air conditioner (step 435) until the next call is received (step 420).

Thus, the invention provides, among other things, a new and useful load management system, and a new and useful method of managing a plurality of devices of a residence with a load management system.

The invention claimed is:

1. A load management system for managing a plurality of devices, the plurality of managed devices being connected to a distribution panel via a plurality of branch circuits having a circuit breaker and an electrical outlet, the distribution panel being powered by at least one of utility power and a backup generator, the load management system being connectable to a device controller to control a first managed device, the system comprising:
 a portable receptacle electrically connectable in circuit between the electrical outlet and a second managed device, the portable receptacle including
  a first antenna,
  a switch to electrically couple the electrical outlet to the second managed device; and
  circuitry electrically coupling the first antenna and the switch, the circuitry controlling the switch based on a signal received by the first antenna; and
 a load management controller connectable to the device controller, the load management controller including a processor, a memory having instructions executable by the processor, and a second antenna coupled to the processor, the processor executing the instructions to receive a control signal from the device controller and to manage the first and second managed devices based on the control signal and a value representing a draw on the generator;
 wherein the load management controller includes a second switch electrically connected between the device controller and the first managed device, and wherein the processor manages the first managed device through executing further instructions to initiate a signal to the second switch that at least one of permits and prevents the control signal to the first managed device.

2. The system of claim 1, wherein the first managed device is an air conditioner, and the control signal includes a call for conditioned air.

3. The system of claim 1, wherein the portable receptacle further includes an input, the circuitry further couples to the input, and the circuitry controls the switch further based on a setting received via the input.

4. The system of claim 3, wherein the input includes a user-movable switch to set a priority.

5. The system of claim 4, wherein the circuitry includes a filter to filter a wireless signal received by the first antenna based on the priority.

6. The system of claim 4, wherein the processor manages the second managed device through executing further instructions to initiate a wireless signal to the portable receptacle via the first antenna, the wireless signal having a parameter based on the priority of the second managed device.

7. The system of claim 1, wherein the processor manages the second managed device through executing further instructions to initiate a wireless signal to the portable receptacle via the first antenna.

8. A backup power system for powering a plurality of managed devices connected to a distribution panel via a plurality of branch circuits, the plurality of branch circuits having a circuit breaker and an electrical outlet, the distribution panel being powered by at least one of utility power and a backup generator, a first managed device includes an air conditioner controlled by a thermostat, the system comprising:
 a transfer switch electrically connectable to receive power from at least one of the utility power and the generator, the transfer switch electrically connectable in circuit with the distribution panel to provide the power to the distribution panel;
 a portable receptacle electrically connectable in circuit between the electrical outlet and a second managed device, the portable receptacle including
  a first antenna,
  a switch to electrically couple the electrical outlet to the second managed device;
  an input, and
  circuitry coupling the first antenna, the switch, and the input, the circuitry controlling the switch based on a signal received by the first antenna and a user-defined setting received via the input;
 a load management controller connectable to the thermostat, the load management controller including a processor, a memory having instructions executable by the processor, and a second antenna electrically coupled to the processor, the processor executing the instructions to receive a control signal from the thermostat and to manage the first and second managed devices based on the control signal and a value representing a draw on the generator;
 wherein the load management controller includes a second switch electrically connected between the thermostat and the first managed device, and wherein the processor manages the first managed device through executing further instructions to initiate a signal to the second switch that at least one of permits and prevents the control signal to the first managed device.

9. A backup power system for powering a plurality of managed devices connected to a distribution panel via a plurality of branch circuits, the plurality of branch circuits having a circuit breaker and an electrical outlet, the distribution panel being powered by at least one of utility power and a backup generator, a first managed device includes an air conditioner controlled by a thermostat, the system comprising:
 a transfer switch electrically connectable to receive power from at least one of the utility power and the generator, the transfer switch electrically connectable in circuit with the distribution panel to provide the power to the distribution panel;

a portable receptacle electrically connectable in circuit between the electrical outlet and a second managed device, the portable receptacle including
a first antenna,
a switch to electrically couple the electrical outlet to the second managed device;
an input, and
circuitry coupling the first antenna, the switch, and the input, the circuitry controlling the switch based on a signal received by the first antenna and a user-defined setting received via the input;
a load management controller connectable to the thermostat, the load management controller including a processor, a memory having instructions executable by the processor, and a second antenna electrically coupled to the processor, the processor executing the instructions to receive a control signal from the thermostat and to manage the first and second managed devices based on the control signal and a value representing a draw on the generator;
wherein the input includes a user-movable switch to set a priority.

10. The system of claim 9, wherein the circuitry includes a filter to filter a wireless signal received by the antenna based on the priority.

11. A method of managing a plurality of devices of a building with a load management system configured to be powered by a backup generator, the plurality of devices including an air conditioner and a managed device, the air conditioner being controlled by a device controller, the building including a plurality of branch circuits having an electrical outlet, the load management system having a portable receptacle including a first antenna, the portable receptacle being electrically coupled in circuit between the electrical outlet and the managed device, the load management system further having a load management controller including a second antenna, the method comprising:
receiving a call for conditioned air;
monitoring a first value representing a draw on the generator;
obtaining a second value representing an expected draw on the generator by the air conditioner;
determining whether the generator can power the air conditioner based on the second value;
determining whether the generator can power the air conditioner and the managed device based on the first and second values; and
managing the managed device and the air conditioner based on the determinations, the managing step including wirelessly communicating with the portable receptacle via the first antenna and the second antenna;
wherein the plurality of devices includes a second managed device, the load management system includes a second portable receptacle coupled to the second managed device, wherein the portable receptacle includes an identity different from the second portable receptacle, and further comprising:
wherein the wirelessly communicating step includes wirelessly transmitting a signal from the second antenna, wirelessly receiving the signal at the first antenna, and determining whether the signal is intended for the portable receptacle based on the identity.

12. The method of claim 11, and further comprising:
changing the identity of the portable receptacle.

13. A method of managing a plurality of devices of a building with a load management system configured to be powered by a backup generator, the plurality of devices including an air conditioner and a managed device, the air conditioner being controlled by a device controller, the building including a plurality of branch circuits having an electrical outlet, the load management system having a portable receptacle including a first antenna, the portable receptacle being electrically coupled in circuit between the electrical outlet and the managed device, the load management system further having a load management controller including a second antenna, the method comprising:
receiving a call for conditioned air;
monitoring a first value representing a draw on the generator;
obtaining a second value representing an expected draw on the generator by the air conditioner;
determining whether the generator can power the air conditioner based on the second value;
determining whether the generator can power the air conditioner and the managed device based on the first and second values; and
managing the managed device and the air conditioner based on the determinations, the managing step including wirelessly communicating with the portable receptacle via the first antenna and the second antenna;
and further comprising:
wherein the wirelessly communicating step includes wirelessly transmitting a signal having a parameter associated with an identifier for the portable receptacle, wirelessly receiving the signal at the portable receptacle, and analyzing the signal at the portable receptacle for the parameter.

14. The method of claim 13, and further comprising:
wherein analyzing the signal includes filtering the signal at a defined frequency range associated with the identifier.

15. The method of claim 14, and further comprising controlling the receptacle based on a control signal in the defined frequency range.

16. A load management system for managing a plurality of devices, the plurality of managed devices being connected to a distribution panel via a plurality of branch circuits having a circuit breaker and an electrical outlet, the distribution panel being powered by at least one of utility power and a backup generator, the load management system being connectable to a device controller to control a first managed device, the system comprising:
a portable receptacle electrically connectable in circuit between the electrical outlet and a second managed device, the portable receptacle including
a first antenna,
a switch to electrically couple the electrical outlet to the second managed device;
a user-controllable input to set a priority; and
circuitry electrically coupling the first antenna, the user-controllable input, and the switch, the circuitry controlling the switch based on a signal received by the first antenna and further based on a setting received via the user-controllable input; and
a load management controller connectable to the device controller, the load management controller including a processor, a memory having instructions executable by the processor, and a second antenna coupled to the processor, the processor executing the instructions to receive a control signal from the device controller and to manage the first and second managed devices based on the control signal and a value representing a draw on the generator.

17. The system of claim 15, wherein the processor manages the second managed device through executing further instructions to initiate a wireless signal to the portable receptacle via the first antenna, the wireless signal having a parameter based on the priority of the second managed device.

* * * * *